United States Patent
Gyppaz et al.

(10) Patent No.: US 11,837,381 B2
(45) Date of Patent: Dec. 5, 2023

(54) METHOD OF MANUFACTURING A FIRE-RESISTANT AND/OR FIRE-RETARDANT CABLE

(71) Applicant: NEXANS, Courbevoie (FR)

(72) Inventors: Franck Gyppaz, Lyons (FR); Thierry Auvray, Lyons (FR); Nicolas Estreboou, Oullins (FR)

(73) Assignee: NEXANS, Courbevoie (FR)

( * ) Notice: Subject to any disclaimer, the term of this patent is extended or adjusted under 35 U.S.C. 154(b) by 787 days.

(21) Appl. No.: 16/904,727

(22) Filed: Jun. 18, 2020

(65) Prior Publication Data

US 2021/0005358 A1 Jan. 7, 2021

(30) Foreign Application Priority Data

Jun. 20, 2019 (FR) .................................. 19 06666

(51) Int. Cl.
| | |
|---|---|
| *H01B 13/24* | (2006.01) |
| *H01B 13/26* | (2006.01) |
| *C04B 20/00* | (2006.01) |
| *C04B 28/00* | (2006.01) |
| *H01B 7/295* | (2006.01) |

(Continued)

(52) U.S. Cl.
CPC ......... *H01B 13/24* (2013.01); *C04B 20/0048* (2013.01); *C04B 28/006* (2013.01); *H01B 7/295* (2013.01); *H01B 13/221* (2013.01); *H01B 13/30* (2013.01); *H01B 19/02* (2013.01); *B28B 3/20* (2013.01); *H01B 13/10* (2013.01); *H01B 13/145* (2013.01); *H01B 13/147* (2013.01); *H01B 13/148* (2013.01); *H01B 13/26* (2013.01); *H01B 13/268* (2013.01); *H01B 13/2613* (2013.01)

(58) Field of Classification Search
CPC .... H01B 13/221; H01B 13/268; H01B 19/02; H01B 13/10; H01B 13/14; H01B 13/145; H01B 13/147; H01B 13/148; H01B 13/0841; H01B 7/295; H01B 13/26; H01B 13/2612; H01B 13/2613; C04B 20/0048; C04B 20/006; B28B 3/20
See application file for complete search history.

(56) References Cited

U.S. PATENT DOCUMENTS

| | | | |
|---|---|---|---|
| 4,018,962 A | 4/1977 | Pedlow | |
| 2017/0345528 A1* | 11/2017 | Gyppaz | ................ H01B 7/295 |
| 2018/0374608 A1 | 12/2018 | Auvray et al. | |

FOREIGN PATENT DOCUMENTS

| | | | |
|---|---|---|---|
| FR | 2 482 769 | | 11/1981 |
| JP | 2017186186 A | * | 10/2017 |
| WO | 90/11605 | | 10/1990 |

OTHER PUBLICATIONS

Polanská et al., "Changes of insulation resistance of fire resistant cable under fire conditions," 2015 IEEE Conference on Electrical Insulation and Dielectric Phenomena (CEIDP), Ann Arbor, MI, USA, 2015, pp. 278-281. (Year: 2015).*

(Continued)

*Primary Examiner* — A. Dexter Tugbang
(74) *Attorney, Agent, or Firm* — Sofer & Haroun, LLP

(57) ABSTRACT

A method of manufacturing a cable includes at least one elongated electrically conducting element and at least one composite layer surrounding the elongated electrically conducting element. The composite layer is obtained from at least one step of impregnation of a non-woven fibrous material with a geopolymer composition.

15 Claims, 1 Drawing Sheet

(51) Int. Cl.
    *H01B 13/22*     (2006.01)
    *H01B 13/30*     (2006.01)
    *H01B 19/02*     (2006.01)
    *B28B 3/20*     (2006.01)
    *H01B 13/10*     (2006.01)
    *H01B 13/14*     (2006.01)

(56) References Cited

OTHER PUBLICATIONS

International Search Report dated Jan. 17, 2020.

\* cited by examiner

[Fig. 1]
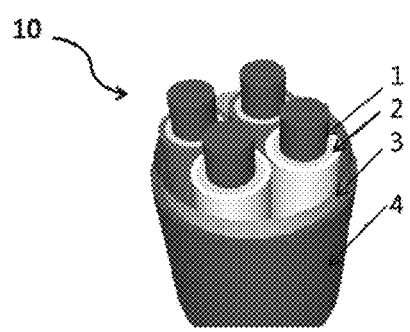
[Fig. 2]
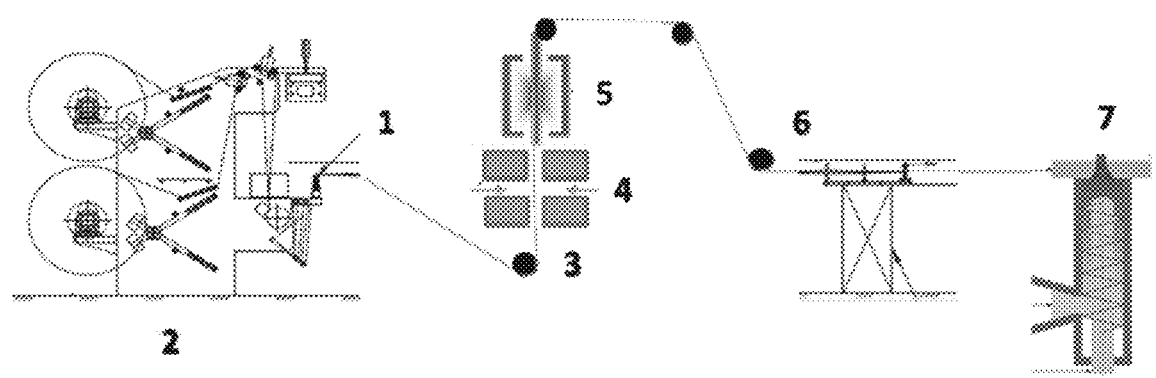

METHOD OF MANUFACTURING A FIRE-RESISTANT AND/OR FIRE-RETARDANT CABLE

PRIORITY CLAIM

This application claims the benefit of priority from French Patent Application No. 19 06666, filed on Jun. 20, 2019, the entirety of which is incorporated by reference.

BACKGROUND

Field of the Invention

The present invention relates to a method of manufacturing a cable comprising at least one elongated electrically conducting element and at least one composite layer surrounding said elongated electrically conducting element, said composite layer being obtained from at least one step of impregnation of a non-woven fibrous material with a geopolymer composition.

It applies typically but not exclusively to fire-retardant and/or fire-resistant cables intended for power transmission and/or data transmission such as fire-retardant and/or fire-resistant electric cables and/or safety optical cables, notably halogen-free, able to function for a given length of time in the conditions of a fire but without being a propagator of fire, nor a generator of large amounts of smoke. These safety cables are in particular medium-voltage power transmission cables (notably from 6 to 45-60 kV) or low-frequency transmission cables, such as control or signalling cables.

Description of Related Art

A method is known from WO 2016/099200 for manufacturing a fire-resistant cable comprising the following steps: a step of preparing a geopolymer composition comprising a sodium silicate, water, potassium hydroxide, an aluminosilicate, and polypropylene fibres; a step of wrapping a non-woven paper tape around an assembly of copper conductors, a step of impregnation by dip-coating of the copper conductors/non-woven paper tape assembly, in the previously prepared geopolymer composition, to form a composite layer surrounding the copper conductors, and then a step of hot extrusion of a protective polymer sheath. It is a long process, notably owing to the drying step, and cannot be carried out continuously. Moreover, the constituent elements of the cable near the composite layer based on a geopolymer material can easily be contaminated by the geopolymer composition.

Objects and Summary

The aim of the invention is consequently to overcome some or all of the aforementioned drawbacks, and supply a method of manufacturing a fire-retardant cable, said method being easy to implement, notably easily industrializable, economical and rapid, and able to lead to a cable having good mechanical properties, notably in terms of flexibility and durability.

The invention relates firstly to a method of manufacturing a cable comprising at least one elongated electrically conducting element and at least one composite layer surrounding said elongated electrically conducting element, characterized in that it comprises at least the following steps:

i) impregnating a non-woven fibrous material with a geopolymer composition, in order to form a tape impregnated with said geopolymer composition, ii) drying the impregnated tape obtained in step i), in order to form a dried impregnated tape, and iii) applying the dried impregnated tape obtained in step ii) around a cable comprising at least one elongated electrically conducting element, in order to form said composite layer surrounding said elongated electrically conducting element.

The method of the invention is quick, easy to implement, notably on an industrial scale, economical, and it guarantees obtaining a fire-resistant and/or fire-retardant cable having good mechanical properties, notably in terms of flexibility and durability. Moreover, the method of the invention makes it possible to avoid contamination of the constituent elements of the cable near the composite layer by the geopolymer composition.

In step i), the non-woven fibrous material is preferably in the form of a tape or a strip.

Step i) may be carried out manually or automatically, and preferably automatically.

Step i) is preferably carried out by coating-impregnation, and especially preferably by pre-controlled coating.

Step i) may for example be carried out using a coating device such as a coating die.

Step i) is more particularly carried out by passing the non-woven fibrous material through a coating device such as a coating die, said device being supplied with the geopolymer composition, notably using means such as a pump. This thus makes it possible to distribute directly the desired amount of the geopolymer composition uniformly over the full desired width of said material.

Step i) may in particular be a coating process known by the English term "tensioned web die coating".

In a preferred embodiment of the invention, the impregnation step i) is carried out at a temperature from about 15° C. to 90° C., and especially preferably from about 20° C. to 40° C.

Step ii) involves drying the impregnated tape obtained in the preceding step i).

Step ii) may be carried out at a temperature of at most about 120° C., and preferably of at most about 110° C. A temperature of at most 120° C., and preferably of at most 110° C. may make it possible to avoid hardening of the composition before step iii).

Step ii) may be carried out at a temperature of at least about 50° C. A temperature of at least 50° C. may make it possible to promote quick drying.

Step ii) is preferably carried out at a temperature from about 70 to 115° C., and especially preferably from about 90 to 107° C.

Step ii) makes it possible to bring the geopolymer composition from a liquid state to a semi-pasty state. More particularly, at the end of step ii) the geopolymer composition comprises at least one phase in the form of an aluminosilicate gel.

Step ii) may be carried out using one or more ovens, notably one or more infrared ovens.

Step iii) may be carried out by applying the dried impregnated tape either directly around one or more elongated conducting elements, or around an inner layer of said cable which is itself around one or more elongated conducting elements.

Step iii) of application of the dried impregnated tape around a cable comprising at least one elongated electrically conducting element may be carried out by wrapping the dried impregnated tape around the cable.

Wrapping may be longitudinal (i.e. along the longitudinal axis of the cable or in other words in the direction of the length of the cable) or helicoidal, and preferably longitudinal.

Longitudinal wrapping may moreover be carried out with overlap zones, the overlap zone or zones representing from about 10 to 20%.

Step iii) may be carried out manually or automatically, and preferably automatically.

Step iii) may be carried out by passing the dried impregnated tape through a confining device or a tape forming device (also denoted by the terms "trumpet" or "tape former"). The cable comprising at least one elongated electrically conducting element also passes through the confining device during step iii). This device is a mechanical device that continuously wraps the dried impregnated tape around the elongated electrically conducting element. This is thus able to facilitate longitudinal wrapping of the impregnated tape around the cable, and thus form said composite layer surrounding said elongated electrically conducting element.

The Non-Woven Fibrous Material

The non-woven fibrous material preferably has a pliable, flexible structure.

The non-woven fibrous material may be selected from cellulosic materials, materials based on synthetic organic polymers, glass fibres, and a mixture thereof, and preferably from materials based on synthetic organic polymers.

The cellulosic materials may be selected from paper, in particular blotting paper; non-woven materials manufactured from functionalized or unfunctionalized cellulose; matrices with a cellular and/or fibrous structure manufactured from natural cellulose acetate fibres.

The materials based on synthetic organic polymers may be selected from the polymer materials with a porous and/or fibrous matrix of polyolefin(s), in particular those selected from homo- and copolymers of propylene, homo- and copolymers of ethylene, high-density polyethylenes (HDPE), aromatic polyamides (aramids), polyesters, and a mixture thereof.

According to a preferred embodiment of the invention, the non-woven fibrous material is a polyethylene terephthalate (PET).

The non-woven fibrous material preferably has a weight from about 50 to 120 g/cm$^2$. This gives a composite layer that is sufficiently flexible for it to be manipulated easily, and sufficiently robust to obtain good fire protection.

According to a preferred embodiment of the invention, the non-woven fibrous material represents from about 2 to 95 wt %, especially preferably from about 5 to 45 wt %, and even more preferably from about 10 to 35 wt %, relative to the total weight of the composite layer.

The Geopolymer Composition

The geopolymer composition used in step i) is preferably a liquid geopolymer composition.

The geopolymer composition in step i) is preferably an aluminosilicate geopolymer composition.

The geopolymer composition of the invention is especially preferably a geopolymer composition comprising water, silicon (Si), aluminium (Al), oxygen (O), and at least one element selected from potassium (K), sodium (Na), lithium (Li), caesium (Cs), and calcium (Ca), and preferably selected from potassium (K) and sodium (Na).

The geopolymer composition may in particular comprise at least one first aluminosilicate, at least one first alkaline silicate, water, and optionally an alkaline base.

In the invention, the geopolymer composition is a precursor composition of a geopolymer. In other words, it comprises ingredients (first aluminosilicate, at least one first alkaline silicate, water, and optionally an alkaline base; or first metakaolin, second metakaolin, first alkaline silicate, water, and optionally an alkaline base and/or a second alkaline silicate as defined hereunder) which geopolymerize together (by polycondensation) to form a geopolymer, also called geopolymer material as defined hereunder.

The First Aluminosilicate

The first aluminosilicate may be selected from the metakaolins (i.e. calcined kaolins), fly-ash, blast furnace slag, swelling clays such as bentonite, calcined clays, any type of compound comprising aluminium and fumed silica, zeolites, and a mixture thereof.

Among these compounds, the metakaolins are preferred, notably those marketed by the company Imérys.

In the invention, the expression "metakaolin" denotes a calcined kaolin or a dehydroxylated aluminosilicate. It is preferably obtained by dehydration of a kaolin or of a kaolinite. This dehydration is obtained conventionally by calcination.

The geopolymer composition may comprise from about 5 to 50 wt % of aluminosilicate, and preferably from about 10 to 35 wt % of aluminosilicate, relative to the total weight of the geopolymer composition.

The geopolymer composition may further comprise a second aluminosilicate different from the first aluminosilicate.

Preferably, the geopolymer composition comprises two calcined kaolins having different calcination temperatures.

According to an especially preferred embodiment of the invention, the geopolymer composition comprises a first metakaolin selected from kaolins calcined at a temperature $T_{c1}$ of at least about 650° C., and a second metakaolin selected from kaolins calcined at a temperature $T_{c2}$ such that $T_{c2}-T_{c1} \geq 100°$ C. approximately, at least one first alkaline silicate, water, and optionally an alkaline base. The geopolymer composition may then have improved mechanical properties, notably in terms of flexibility and durability, while guaranteeing good properties of reaction and resistance to fire.

As the second metakaolin is selected from kaolins calcined at a temperature $T_{c2}$ such that $T_{c2}-T_{c1} \geq 100°$ C. approximately, it is different from the first metakaolin as defined in the invention.

According to one embodiment of the invention, the first metakaolin is a kaolin calcined at a temperature $T_{c1}$ of at least about 700° C., and preferably of at least about 725° C.

According to a preferred embodiment of the invention, the first metakaolin is a kaolin calcined at a temperature $T_{c1}$ of at most about 875° C., and preferably of at most about 825° C.

The first metakaolin may comprise at least about 20 mol %, and preferably at least about 30 mol % of aluminium oxide ($Al_2O_3$), relative to the total number of moles of the first metakaolin.

The first metakaolin may comprise at most about 60 mol %, and preferably at most about 50 mol % of aluminium oxide ($Al_2O_3$), relative to the total number of moles of the first metakaolin.

The first metakaolin may comprise at least about 35 mol %, and preferably at least about 45 mol % of silicon oxide ($SiO_2$), relative to the total number of moles of the first metakaolin.

The first metakaolin may comprise at most about 75 mol %, and preferably at most about 65 mol % of silicon oxide ($SiO_2$), relative to the total number of moles of the first metakaolin.

As examples of the first metakaolin, we may mention the metakaolins sold by the company Imérys, notably that marketed under the reference PoleStar® 450.

The first metakaolin may be selected from the kaolins calcined at $T_{c1}$ as defined in the invention, for at least about 1 min, preferably for at least about 10 min, especially preferably for a time from about 30 min to 8 h, and more especially preferably for a time from about 2 h to 6 h.

The second metakaolin is preferably selected from kaolins calcined at a temperature $T_{c2}$ such that $T_{c2}-T_{c1} \geq 150°$ C. approximately, especially preferably such that $T_{c2}-T_{c1} \geq 200°$ C. approximately, and more especially preferably such that $T_{c2}-T_{c1} \geq 250°$ C. approximately.

According to one embodiment of the invention, the second metakaolin is a kaolin calcined at a temperature $T_{c2}$ of at least about 800° C., preferably of at least about 850° C., and especially preferably of at least about 900° C.

According to a preferred embodiment of the invention, the second metakaolin is a kaolin calcined at a temperature $T_{c2}$ of at most about 1200° C., and preferably of at most about 1150° C.

The second metakaolin may comprise at least about 20 mol %, and preferably at least about 30 mol % of aluminium oxide ($Al_2O_3$), relative to the total number of moles of the second metakaolin.

The second metakaolin may comprise at most about 60 mol %, and preferably at most about 50 mol % of aluminium oxide ($Al_2O_3$), relative to the total number of moles of the second metakaolin.

The second metakaolin may comprise at least about 35 mol %, and preferably at least about 45 mol % of silicon oxide ($SiO_2$), relative to the total number of moles of the second metakaolin.

The second metakaolin may comprise at most about 75 mol %, and preferably at most about 65 mol % of silicon oxide ($SiO_2$), relative to the total number of moles of the second metakaolin.

As examples of the second metakaolin, we may mention the metakaolins sold by the company Imérys, notably that marketed under the reference PoleStar® 200R.

The second metakaolin may be selected from the kaolins calcined at $T_{c2}$ as defined in the invention, for at least about 1 min, preferably for at least about 5 min, especially preferably for a time from about 10 min to 2 h, and more especially preferably for a time from about 15 min to 1 h.

The weight ratio [first metakaolin/second metakaolin] in the geopolymer composition preferably ranges from about 0.1 to 2, especially preferably from about 0.5 to 1.0, and more especially preferably is about 1.

The geopolymer composition may comprise from about 5 to 50 wt %, and preferably from about 10 to 35 wt % of the first and second metakaolins, relative to the total weight of the geopolymer composition.

The first and second metakaolins may be analysed by differential thermal analysis (DTA) [presence or absence of a crystallization point or peak], nuclear magnetic resonance (NMR) [NMR$^{27}$ Al spectrum], and/or X-ray diffraction (XRD).

The first metakaolin preferably has a crystallization peak in differential thermal analysis, especially preferably at a temperature from 900 to 1060° C., and more especially preferably at a temperature from 950 to 1010° C.

The second metakaolin preferably comprises mullite.

The First Alkaline Silicate

The first alkaline silicate may be selected from sodium silicates, potassium silicates, and a mixture thereof.

The alkaline silicates marketed by the company Silmaco or by the company PQ Corporation are preferred. The first alkaline silicate is preferably a sodium silicate.

The first alkaline silicate may have a molar ratio $SiO_2/M_2O$ from about 1.1 to 35, preferably from about 1.3 to 10, and especially preferably from about 1.4 to 5, with M being a sodium atom or a potassium atom, and preferably a sodium atom.

The geopolymer composition may comprise from about 5 to 60 wt %, and preferably from about 10 to 50 wt % of the first alkaline silicate, relative to the total weight of the geopolymer composition.

The Second Alkaline Silicate

The geopolymer composition may further comprise a second alkaline silicate different from the first alkaline silicate.

The second alkaline silicate may be selected from sodium silicates, potassium silicates, and a mixture thereof. The alkaline silicates marketed by the company Silmaco or by the company PQ Corporation are preferred. The second alkaline silicate is preferably a sodium silicate.

The first and second alkaline silicates may respectively have molar ratios $SiO_2/M_2O$ and $SiO_2/M'_2O$ such that M and M', which are identical, are selected from a sodium atom and a potassium atom, and preferably a sodium atom, and said ratios have different values, preferably values such that their difference is at least 0.3, especially preferably such that their difference is at least 0.5, and more especially preferably such that their difference is at least 1.0.

According to one embodiment of the invention, the geopolymer composition comprises:
a first alkaline silicate having a molar ratio $SiO_2/M_2O$ from about 1.5 to 2.6, and
a second alkaline silicate having a molar ratio $SiO_2/M'_2O$ greater than 2.6, preferably from about 2.8 to 4.5, and especially preferably from about 3.0 to 4.0, it being understood that M' is identical to M.

The geopolymer composition may comprise from about 10 to 60 wt %, and preferably from about 20 to 50 wt % of the first and second alkaline silicates, relative to the total weight of the geopolymer composition.

The weight ratio [first alkaline silicate/second alkaline silicate] in the geopolymer composition preferably ranges from 0.5 to 2.5, and especially preferably from 0.8 to 2.0.

The Alkaline Base

The alkaline base may be sodium hydroxide, or potassium hydroxide, and preferably sodium hydroxide.

The geopolymer composition may be free from alkaline base. This may improve manipulation of the geopolymer composition, in particular during preparation of a cable.

The solids/water weight ratio in said geopolymer composition determines the kinetics of solidification in steps i) to iii).

The geopolymer composition may comprise from about 35 to 80 wt %, and especially preferably from about 40 to 70 wt %, of solid materials (alkaline silicate(s), aluminosilicate(s) and alkaline base), relative to the total weight of said geopolymer composition.

The geopolymer composition may further comprise one or more additives selected from:
a dye,
mineral fibres, notably selected from alumina fibres,
an additive with a polymer structure, notably selected from polyolefin fibres such as polypropylene fibres, high-density polyethylene (HDPE), aramids, and technical glass fibres coated with silicone or with an organic polymer of the polyethylene type; a styrene-butadiene copolymer (SBR); a styrene-butadiene-ethylene copolymer (EBS); derivatives of styrene-ethylene copolymers, notably those marketed by Kraton such as a copolymer of styrene-ethylene-butylene-styrene (SEBS), a styrene-butadiene-styrene copolymer (SBS), a styrene-isoprene-styrene copolymer (SIS), a styrene-propylene-ethylene copolymer (EPS) or a styrene-ethylene-propylene-styrene copolymer (SEPS); an ethylene/vinyl acetate copolymer (EVA), a polyorganosiloxane that has been crosslinked (e.g. by means of a peroxide); polyethylene optionally in powder form; lignosulphonates; cellulose acetate; other cellulose derivatives; a low-viscosity silicone oil (e.g. of the order of 12500 cP); and a polyethylene oil, a caking accelerating compound, notably selected from aluminium sulphate, alums (e.g. aluminium-potassium double sulphate), calcium chloride, calcium sulphate, hydrated calcium sulphate, sodium aluminate, sodium carbonate, sodium chloride, sodium silicate, sodium sulphate, iron(III) chloride, and sodium lignosulphonates, a caking retarding agent, notably selected from ammonium, the alkali metals, the alkaline-earth metals, borax, the lignosulphonates and in particular the metal salts of calcium lignosulphonates, celluloses such as carboxymethyl hydroethyl cellulose, the sulphoalkylated lignins such as for example sulphomethylated lignin, hydroxycarboxylic acids, the copolymers of salts of 2-acrylamido-2-methylpropane sulphonic acid and of acrylic acid or maleic acid, and the saturated salts, an inert filler, notably selected from talc, micas, dehydrated clays, and calcium carbonate, a starch, a starch plasticizer, notably selected from a metal stearate, a polyethylene glycol, an ethylene glycol, a polyol such as glycerol, sorbitol, mannitol, maltitol, xylitol or an oligomer of one of these polyols, a sucrose such as glucose or fructose, a plasticizer containing amide groups, and any type of plasticizer based on modified polysaccharide(s), a cellulose derivative, an expanded carbon-containing material such as an expanded graphite.

The dye is preferably a dye that is liquid at room temperature (i.e. at 18-25° C.).

The geopolymer composition may comprise at most about 15 wt % of additive(s), preferably at most about 8 wt % of additive(s), and especially preferably at most about 5 wt % of additive(s), relative to the total weight of the geopolymer composition.

According to an especially preferred embodiment of the invention, the geopolymer composition comprises at most about 15 wt % of organic additive(s) such as organic polymer(s), preferably at most about 8 wt % of organic additive(s) such as organic polymer(s), and especially preferably at most about 5 wt % of additive(s) such as organic polymer(s), relative to the total weight of the geopolymer composition.

The geopolymer composition may comprise at least about 0.01 wt % of additive(s), and preferably at least about 0.5 wt % of additive(s), relative to the total weight of the geopolymer composition.

The Composite Layer

The composite layer is preferably an electrically insulating layer.

In the present invention, "electrically insulating layer" means a layer whose electrical conductivity may be at most $1 \cdot 10^{-9}$ S/m, and preferably at most $1 \cdot 10^{-10}$ S/m (siemens per metre) (at 25° C.).

The composite layer is preferably a fire-retardant and/or fire-resistant layer.

The composite layer preferably has a thickness from about 0.2 to 3 mm, and especially preferably from about 0.5 to 1 mm.

When the thickness of the composite layer is less than 0.2 mm, the thermal protection of the cable obtained according to the method of the invention is not sufficient.

The composite layer of the invention is preferably a ribboned layer (i.e. in the form of a tape or a strip).

The composite layer preferably has an approximately constant thickness and notably constitutes a continuous protective envelope.

The composite layer may in particular comprise 2 to 3 superposed tapes.

The composite layer of the invention is preferably not porous.

The composite layer is preferably an inner layer of said cable.

According to the invention, "inner layer" means a layer that does not constitute the outermost layer of the cable.

The composite layer preferably comprises at least one geopolymer material and the non-woven fibrous material as defined in the invention.

The Geopolymer Material

In the present invention, the geopolymer material is obtained from a geopolymer composition as defined in the invention, preferably by hardening, geopolymerization and/or polycondensation of said geopolymer composition.

In particular, the geopolymer composition as defined in the invention is able to form said geopolymer material. The ingredients of the geopolymer composition may therefore undergo polycondensation to form said geopolymer material. Hardening takes place by internal reaction of the polycondensation type. Hardening is not, for example, the result of simple drying, as is generally the case for binders based on alkaline silicates.

In fact, the geopolymers materials result from a mineral polycondensation reaction by alkaline activation, called geosynthesis, in contrast to the conventional hydraulic binders in which hardening is the result of hydration of the calcium aluminates and calcium silicates.

In the present invention, the expression "geopolymer material" signifies a solid material comprising silicon (Si), aluminium (Al), oxygen (O) and at least one element selected from potassium (K), sodium (Na), lithium (Li), caesium (Cs) and calcium (Ca), and preferably selected from potassium (K) and sodium (Na).

The geopolymer material may be an aluminosilicate geopolymer material.

The aluminosilicate geopolymer material may be selected from the poly(sialates) corresponding to formula (I) $M_n(-Si-O-Al-O-)_n$ [(M)-PS] and having a molar ratio Si/Al equal to 1, the poly(sialate-siloxos) corresponding to formula (II) $M_n(-Si-O-Al-O-Si-O-)_n$ [(M)-PPS] and having a molar ratio Si/Al equal to 2, the poly(sialate-disiloxos) corresponding to formula (III) $M_n(-Si-O-Al-O-Si-O-Si-O-)_n$ [(M)-PSDS] and having a molar ratio Si/Al equal to 3, and other poly(sialates) with ratio Si/Al>3, the aforementioned poly(sialates) comprising an alkaline cation M selected from K, Na, Li, Cs and a mixture thereof, and n denotes the degree of polymerization.

In one embodiment, the geopolymer material represents from about 5 to 98 wt %, preferably from about 55 to 95 wt %, and more preferably from about 65 to 90 wt %, relative to the total weight of the composite layer.

The method may further comprise, before step i), a step $i_0$) of preparation of the geopolymer composition comprising the mixture of said first aluminosilicate with said first alkaline silicate, water, and optionally the alkaline base.

Step $i_0$) is generally carried out at a high pH, notably in the range from 10 to 13.

Step $i_0$) preferably comprises the following substeps:
  $i_{01}$) a substep of preparation of an aqueous solution of the first alkaline silicate, and
  $i_{02}$) a substep of mixing the first aluminosilicate in the form of powder with the aqueous solution of alkaline silicate prepared in the preceding substep $i_{01}$).

The aqueous solution of the first alkaline silicate may be prepared by mixing silicon dioxide $SiO_2$ or an alkaline silicate with a base MOH in which M is K or Na.

The silicon dioxide $SiO_2$ may be selected from fumed silica (i.e. pyrogenic silica), quartz, and mixtures thereof.

Substep $i_{01}$) may be carried out by dissolving the base in water, resulting in release of heat (exothermic reaction), and then adding the silica (or the alkaline silicate). The heat released then accelerates dissolution of the silica (or alkaline silicate) in substep $i_{01}$), and of the first aluminosilicate in substep $i_{02}$).

When the second aluminosilicate and/or the second alkaline silicate as defined in the invention is/are present, step $i_0$) of preparation of the geopolymer composition may comprise mixing said first aluminosilicate (preferably in the form of powder), and optionally said second aluminosilicate (preferably in the form of powder), with said first alkaline silicate (preferably in aqueous solution), optionally said second alkaline silicate (preferably in aqueous solution).

Step $i_0$) preferably comprises mixing the first and second metakaolins with the first alkaline silicate and optionally the second alkaline silicate, water, and optionally an alkaline base.

The first and second metakaolins and the first and second alkaline silicates are as defined in the invention.

According to a preferred embodiment, step $i_0$) comprises the following substeps:
  $i_{0a}$) mixing the first and second alkaline silicates (preferably in aqueous solutions), notably with stirring,
  $i_{0b}$) optionally adding an alkaline base, notably while maintaining stirring, and
  $i_{0c}$) adding the first and second metakaolins (preferably in the form of powders), notably while maintaining stirring.

At the end of step $i_0$), or of substep $i_{02}$) or $i_{0c}$), a fluid, homogeneous solution is preferably obtained.

At the end of step $i_0$), the geopolymer composition may comprise from about 35 to 80 wt %, and especially preferably from about 40 to 70 wt %, of solid materials (alkaline silicate(s), aluminosilicate(s) and alkaline base), relative to the total weight of said geopolymer composition.

This weight ratio can provide a geopolymer composition that is sufficiently fluid to allow manipulation thereof, and with slow enough solidification kinetics to allow formation of a cable layer as defined hereunder.

The solids/water weight ratio in said geopolymer composition may make it possible to determine the solidification kinetics of said geopolymer composition.

After step $i_0$) of preparation of the geopolymer composition, and before the impregnation step i), the geopolymer composition may be heated, notably to a temperature from about 55° C. to 95° C., and especially preferably from about 70° C. to 90° C. This will thus facilitate step i).

The method may further comprise, after step iii), a step iv) of application of an external protective sheath around the composite layer. The external protective sheath can ensure mechanical integrity of the cable.

At the end of step iv), the cable may then comprise at least one elongated electrically conducting element, the composite layer surrounding said elongated electrically conducting element, and at least one external protective sheath surrounding said composite layer.

Step iv) is preferably carried out by extrusion, notably at a temperature from about 140° C. to 195° C.

Step iv) may be carried out using an extruder.

In this embodiment, an extrusion head may be positioned at the outlet of the forming device as defined in the invention.

The external protective sheath is preferably the outermost layer of the cable.

The external protective sheath is preferably an electrically insulating layer.

The external protective sheath is preferably made of a halogen-free material. It may be produced conventionally starting from materials that retard flame propagation or are resistant to flame propagation. Notably, if the latter do not contain halogen, it is called cladding of the HFFR type (for "Halogen Free Flame Retardant").

The external protective sheath may comprise at least one organic or inorganic polymer.

The choice of the organic or inorganic polymer is not limiting, and they are well known by a person skilled in the art.

According to a preferred embodiment of the invention, the organic or inorganic polymer is selected from the crosslinked and non-crosslinked polymers.

The organic or inorganic polymer may be a homopolymer or a copolymer having thermoplastic and/or elastomeric properties.

The inorganic polymers may be polyorganosiloxanes.

The organic polymers may be polyurethanes or polyolefins.

The polyolefins may be selected from the polymers of ethylene and of propylene. As examples of ethylene polymers, we may mention linear low-density polyethylene (LLDPE), low-density polyethylene (LDPE), medium-density polyethylene (MDPE), high-density polyethylene (HDPE), ethylene/vinyl acetate copolymers (EVA), ethylene/butyl acrylate copolymer (EBA), ethylene/methyl acrylate copolymer (EMA), 2-hexylethyl acrylate (2HEA), copolymers of ethylene and alpha-olefins such as for example polyethylene-octene (PEO), copolymers of ethylene and propylene (EPR), terpolymers of ethylene and propylene (EPT) such as for example the terpolymers of ethylene-propylene-diene monomer (EPDM) or a mixture thereof.

The polymer of the external protective sheath is preferably an organic polymer, more preferably an ethylene polymer, and more preferably an ethylene/vinyl acetate copolymer, a linear low-density polyethylene, or a mixture thereof.

The external protective sheath may further comprise a hydrated fireproofing mineral filler. This hydrated fireproofing mineral filler acts mainly physically by decomposing endothermically (e.g. release of water), which has the consequence of lowering the temperature of the sheath and limiting flame propagation along the cable. We notably refer to flame retarding properties, well known as "flame retardant".

The hydrated fireproofing mineral filler may be a metal hydroxide such as magnesium hydroxide or aluminium trihydroxide.

The external protective sheath may further comprise an inert filler, notably selected from talc, the micas, dehydrated clays and a mixture thereof.

Advantageously, the cable obtained by a method according to the invention satisfies at least one of the standards for reaction or non-propagation in a fire selected from the standards EN 60332-1, EN 60332-3, and EN 50399 (2012/02+A1 2016); and preferably standard EN 50399 (2012/02+A1 2016), in particular the classification criteria B2ca, s1a, d0, a1 of said standard, and optionally standards EN 60332-1 and EN 60332-3.

According to one embodiment of the invention, the cable is a power cable and/or a telecommunication cable, and preferably an electric cable.

When the cable comprises a plurality of elongated electrically conducting elements, the composite layer may then surround the plurality of elongated electrically conducting elements of the cable.

The cable may comprise a single composite layer as defined in the invention or a plurality of composite layers as defined in the invention.

When the cable comprises a plurality of composite layers, the method may further comprise repetition of steps i) to iii), as many times as there are composite layers to be applied, and then optionally step iv) as defined in the invention.

Preferably, the cable comprises a single composite layer, and more especially preferably a single internal composite layer.

According to one embodiment of the invention, the cable obtained according to the method of the invention further comprises one or more layers interposed between the elongated electrically conducting element and the composite layer as defined in the invention.

These layers may comprise one or more polymer layers such as electrically insulating polymer layers, and/or one or more metallic layers such as metallic layers containing one or more apertures.

In this case, the method further comprises, before step i) or before step iii), one or more steps of application of one or more of the aforementioned layers, around the elongated electrically conducting element, the assembly of elongated electrically conducting elements, or around each of the elongated electrically conducting elements, depending on the type of cable required.

The metallic layers containing one or more apertures are typically layers used in radiating cables that are familiar to a person skilled in the art.

According to a preferred embodiment of the invention, the cable comprises:
- a plurality of electrically conducting elements, each of said electrically conducting elements being surrounded by a polymer layer, notably electrically insulating, to form a plurality of insulated electrically conducting elements,
- a composite layer as defined in the invention surrounding said plurality of insulated electrically conducting elements, and
- an external protective sheath, notably electrically insulating, surrounding said composite layer.

The method according to the invention is preferably a continuous method. In other words, at least steps i) to iii), and preferably at least steps i) to iv) are carried out continuously.

In the invention, the expression "continuous method" signifies that the method is carried out on a single production line, and/or without steps of resting, collection, or recovery. In other words, in the method according to the invention, there are no intermediate steps of resting between distribution of the non-woven fibrous material, and recovery/production of the final cable. In other words, moreover, steps i), ii), iii), and iv) if it is present, are concomitant, i.e. steps i), ii), iii), and iv) if it is present, are carried out at the same time.

According to this embodiment, the non-woven fibrous material may be arranged on a distributor such as an unreeling device or unwinder, and said material may be distributed or unwound continuously for carrying out at least steps i) to iii) or steps i) to iv).

Preferably, step i) is carried out by passing the non-woven fibrous material through a coating device supplied with the geopolymer composition at a flow rate D (in kg/min), the distributor delivers the non-woven fibrous material at a speed V (in km/min), and the ratio D/V ranges from about 20 to 50 kg of geopolymer composition/km of non-woven fibrous material, and especially preferably from about 25 to 40 kg of geopolymer composition/km of non-woven fibrous material. The amount of geopolymer composition applied on the non-woven fibrous material may thus be controlled easily by a pump.

The speed V is preferably identical to the speed of travel of the cable.

The flow rate D may range from about 0.5 kg/min to 4.5 kg/min.

The speed V may range from about 20 m/min to 150 m/min.

According to an especially preferred embodiment of the invention, the non-woven fibrous material passes through the coating device for carrying out step i), then the impregnated tape obtained passes through one or more ovens, preferably through several ovens arranged successively one after another for carrying out step ii), then the dried impregnated tape passes through the tape forming device through which a cable comprising at least one elongated electrically conducting element travels, for carrying out step iii), and finally the cable obtained passes through an extruder head, in order to carry out step iv).

In step ii), transformation from the liquid state to the pasty state requires a large amount of energy. The use of several ovens makes it possible to optimize drying of the impregnated tape (in terms of exposure time, speed V and amount of energy supplied).

The method according to the invention is quick, simple and advantageous from an economic viewpoint. It makes it possible to manufacture, in just a few steps, a cable having good mechanical properties, notably in terms of flexibility and durability, while guaranteeing good fire resistance performance.

The invention will be better understood, and other aims, details, features and advantages thereof will become clearer from the following description of particular embodiments of the invention, given only for purposes of illustration, and non-limiting, referring to the appended figures.

EXAMPLES

Brief Description of the Drawings

The appended drawings illustrate the invention:
FIG. 1 shows a schematic view of an electric cable as obtained by the method according to the invention.
FIG. 2 shows a schematic view of the method according to the invention.

For clarity, only the elements essential for understanding the invention are shown schematically in these figures, and they are not drawn to scale.

DETAILED DESCRIPTION

The electric cable 100, illustrated in FIG. 1, corresponds to a fire-resistant electric cable of type K25 or RZ1K.

This electric cable 100 comprises four elongated electrically conducting elements 10, each of which is insulated with an electrically insulating layer 20, and, successively and coaxially around these four elongated insulated electrically conducting elements (10, 20), a composite layer 30 as defined in the invention surrounding the four elongated insulated electrically conducting elements (10, 20), and an outer sheath 40 of type HFFR surrounding the composite layer 30 as defined in the invention, and is advantageously in the form of a tape.

FIG. 2 is a schematic view of the method according to the invention, carried out continuously. In particular, a non-woven fibrous material 1 in the form of a tape is put on a winder 2, unwound and brought up to a coating die 3 supplied with a geopolymer composition 4, in order to allow impregnation of the non-woven fibrous material 1 with said geopolymer composition [step i)]. Then the impregnated tape is transported to an oven 5, to allow it to be dried [step ii)]. The dried impregnated tape is then brought into a confining device 6, through which a cable comprising at least one elongated electrically conducting element is travelling, in order to allow longitudinal wrapping of the dried impregnated tape around the cable, and thus form said composite layer surrounding said elongated electrically conducting element [step iii)], and finally the cable obtained passes through an extrusion head 7 for forming the external protective sheath [step iv)].

The following examples provide an illustration of the present invention. They do not in any way limit the overall scope of the invention as presented in the claims.

The raw materials used in the examples are listed below:

aqueous solution of a first sodium silicate at about 50 wt %, of the "waterglass" type, Simalco, sodium silicate with $SiO_2/Na_2O$ molar ratio of about 2.0, aqueous solution of a second sodium silicate at about 38 wt %, of the "waterglass" type, Simalco, sodium silicate with $SiO_2/Na_2O$ molar ratio of about 3.4, first metakaolin, PoleStar® 450, Imérys, with $Al_2O_3/SiO_2$ molar ratio of 41/55 (i.e. about 0.745), kaolin calcined at a temperature of about 700° C., second metakaolin, PoleStar® 200R, Imérys, with $Al_2O_3/SiO_2$ molar ratio of 41/55 (i.e. of about 0.745), kaolin calcined at a temperature of about 1000° C., and non-woven polyester material, GT320, GECA TAPES.

Unless stated otherwise, all these raw materials were used as received from the manufacturers.

Example 1: Preparation of a Fire-Resistant Cable by a Method According to the Invention A geopolymer composition was prepared as follows: an aqueous solution of alkaline silicates was prepared by mixing 40 g of an aqueous solution at 50 wt % of a first sodium silicate and 40 g of an aqueous solution at 38 wt % of a second sodium silicate. Then 10 g of a first metakaolin and 10 g of a second metakaolin were mixed with the aqueous solution of alkaline silicates. Said geopolymer composition comprises about 55.2 wt % of solid materials, relative to the total weight of said geopolymer composition.

A non-woven fibrous polyester material in the form of a tape is put on a winder, unwound at a speed of about 50 m/min, and brought up to a coating die supplied with said geopolymer composition at a flow rate of 1.25 kg/min, in order to allow impregnation of the non-woven fibrous material with the geopolymer composition. The geopolymer composition has a temperature of about 40° C.

The impregnated tape is then brought to a first IR oven operating at a temperature of 800° C., then a second IR oven operating at a temperature of 800° C., and finally to a third IR oven operating at a temperature of 800° C., in order to allow drying of the impregnated tape.

The dried impregnated tape is then brought into a confining device through which a low-voltage cable is travelling, in order to allow longitudinal wrapping of the impregnated tape around the cable. The cable comprises 5 copper conductors of section 1.5 mm$^2$, each of the conductors being surrounded with an electrically insulating layer based on XLPE. At the end of the step of application of the impregnated tape around the cable, a composite layer surrounding the insulated conductors is obtained.

The composite layer formed has a thickness of 0.5 mm.

The assembly obtained is then covered by hot extrusion with a protective polymer sheath based on a mixture HFFR produced by NEXANS based on polyethylene and fireproofing fillers, said sheath having a thickness of about 2 mm. A cable according to the invention has thus been obtained. The flame-retardant performance of the cable is determined according to standard EN50399. 15 sections of cable positioned on a vertical ladder are exposed to a flame with a power of 20 kW for 20 min.

The results are reported in Table 1 below:

TABLE 1

| Performance parameters | Values | Class according to EN50399 |
|---|---|---|
| pHRR (kW) | 13.8 | B2 |
| Time at peak HRR (s) | 912 | |
| THR (MJ) | 5.2 | |
| FIGRA (w/s) | 23.6 | |
| Flame propagation (m) | 0.56 | |
| Flaming droplets | None | d0 |
| SPR (m$^2$/s) | 0.03 | s1 |
| Time at peak SPR (s) | 876 | |
| TSP (m$^2$) | 28.12 | |

In this table, the acronym HRR corresponds to the expression "Heat Release Rate", which informs on the heat flow, the acronym THR corresponds to the expression "Total Heat Release", which informs on the amount of heat released during combustion, the acronym FIGRA corresponds to the expression "Fire GRowth rAte", which informs on the growth rate of the fire, the acronym SPR corresponds to the expression "Smoke Production Rate", which informs on the rate of production of smoke, and the acronym TSP corresponds to the expression "Total Smoke Production", which informs on the total amount of smoke produced.

These results demonstrate that the cable according to the invention displays the maximum fire protection properties with respect to the requirements of the European standard EN50399.

The invention claimed is:

1. A method of manufacturing a cable having at least one elongated electrically conducting element and at least one composite layer surrounding said elongated electrically conducting element, said method comprising the steps of:

i) impregnating a non-woven fibrous material with a geopolymer composition, in order to form a tape impregnated with said geopolymer composition, ii) drying the impregnated tape obtained in step i), in order to form a dried impregnated tape, and iii) applying the dried impregnated tape obtained in step ii) around the cable comprising at least one elongated electrically conducting element, in order to form said at least one composite layer surrounding said elongated electrically conducting element.

2. The method according to claim 1, wherein the non-woven fibrous material is selected from at least one of cellulosic materials, materials based on synthetic organic polymers, glass fibres, and a mixture thereof.

3. The method according to claim 1, wherein the geopolymer composition is an aluminosilicate geopolymer composition.

4. The method according to claim 1, wherein step i) is carried out by coating-impregnation.

5. The method according to claim 1, wherein step i) is carried out by passing the non-woven fibrous material through a coating device supplied with the geopolymer composition.

6. The method according to claim 1, wherein step ii) is carried out at a temperature of at most 120° C.

7. The method according to claim 1, wherein step ii) is carried out at a temperature of at least 50° C.

8. The method according to claim 1, wherein step iii) of applying of the dried impregnated tape around the cable comprising the at least one elongated electrically conducting element is carried out by wrapping the dried impregnated tape around the cable.

9. The method according to claim 8, wherein the wrapping is longitudinal.

10. The method according to claim 1, wherein step iii) is carried out by passing the dried impregnated tape through a confining device.

11. The method according to claim 1, wherein said method further comprises, after step iii), a step iv) of an application of an external protective sheath around the at least one composite layer.

12. The method according to claim 11, wherein step iv) is carried out by extrusion.

13. The method according to claim 1, wherein said method of steps i) to iii) are a continuous method.

14. The method according to claim 13, wherein the non-woven fibrous material is arranged on a distributor, and said non-woven fibrous material is distributed continuously for carrying out at least steps i) to iii).

15. The method according to claim 14, wherein step i) is carried out by passing the non-woven fibrous material through a coating device supplied with the geopolymer composition at a flow rate D (in kg/min), the distributor delivers the non-woven fibrous material at a speed V (in km/min), and the ratio D/V ranges from 20 to 50 kg of geopolymer composition per km of non-woven fibrous material.

* * * * *